(12) United States Patent
Zhao et al.

(10) Patent No.: US 12,160,919 B2
(45) Date of Patent: Dec. 3, 2024

(54) DATA SERVICE HANDOVER METHOD AND APPARATUS

(71) Applicant: Honor Device Co., Ltd., Shenzhen (CN)

(72) Inventors: Zhihua Zhao, Shenzhen (CN); Kai Du, Shenzhen (CN); Liwei Cui, Shenzhen (CN); Yuanyuan Liu, Shenzhen (CN); Lixin Lin, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 172 days.

(21) Appl. No.: 17/755,948

(22) PCT Filed: May 14, 2021

(86) PCT No.: PCT/CN2021/093891
§ 371 (c)(1),
(2) Date: May 12, 2022

(87) PCT Pub. No.: WO2021/228240
PCT Pub. Date: Nov. 18, 2021

(65) Prior Publication Data
US 2022/0386190 A1 Dec. 1, 2022

(30) Foreign Application Priority Data
May 14, 2020 (CN) .......................... 202010407134.0

(51) Int. Cl.
*H04W 36/00* (2009.01)
*H04W 36/30* (2009.01)
(Continued)

(52) U.S. Cl.
CPC ....... *H04W 76/19* (2018.02); *H04W 36/0055* (2013.01); *H04W 36/305* (2018.08); *H04W 76/15* (2018.02); *H04W 36/0069* (2018.08)

(58) Field of Classification Search
CPC ......... H04W 36/0005; H04W 36/0055; H04W 36/0069; H04W 76/14; H04W 76/15;
(Continued)

(56) References Cited

U.S. PATENT DOCUMENTS 10,271,373 B2 * 4/2019 Susitaival ............. H04W 76/18
11,032,866 B2 6/2021 Mei-Ju et al.
(Continued)

FOREIGN PATENT DOCUMENTS

CN 107079514 A 8/2017
CN 110798903 A 2/2020
(Continued)

OTHER PUBLICATIONS

OPPO, "Fast MCG recovery for MR-DC enhancement", 3GPP TSG-RAN2#106, R2-1905590, Apr. 13-Apr. 17, 2019, 4 Pages, Reno, USA.
(Continued)

*Primary Examiner* — Jenee Holland
(74) *Attorney, Agent, or Firm* — Slater Matsil, LLP

(57) ABSTRACT

Embodiments of this application provide a data service handover method and an apparatus. The method includes: a terminal device detects failure of a secondary cell group; and the terminal device starts a timer, and if a network device has not handed over to a master base station within a timing duration of the timer a data service transmitted by the secondary cell group, when the timer expires, the terminal device notifies the network device to hand over the data service to the master base station.

18 Claims, 8 Drawing Sheets

(51) Int. Cl.
*H04W 76/15* (2018.01)
*H04W 76/19* (2018.01)

(58) Field of Classification Search
CPC . H04W 76/19; H04W 36/0011; H04W 36/24; H04W 36/30; H04W 36/305
See application file for complete search history.

(56) References Cited

U.S. PATENT DOCUMENTS

| | | |
|---|---|---|
| 11,134,400 B2 | 9/2021 | Fangying et al. |
| 11,206,707 B2 | 12/2021 | Singh et al. |
| 2016/0338136 A1 | 11/2016 | Tao et al. |
| 2018/0352491 A1* | 12/2018 | Shih ................ H04W 36/144 |
| 2019/0166646 A1* | 5/2019 | Shih .................. H04W 72/04 |
| 2020/0029251 A1* | 1/2020 | Wu ................... H04W 36/0083 |
| 2020/0154330 A1* | 5/2020 | Paladugu ............ H04W 36/302 |
| 2020/0336948 A1* | 10/2020 | Kawasaki ............. H04W 36/14 |
| 2021/0022057 A1* | 1/2021 | Sabouri-Sichani ......................... H04W 36/00725 |
| 2021/0160136 A1 | 5/2021 | Wei et al. |
| 2021/0385897 A1* | 12/2021 | Purkayastha ......... H04W 76/18 |
| 2022/0053392 A1* | 2/2022 | Wang ................ H04W 36/0079 |
| 2022/0124568 A1* | 4/2022 | Wu ........................ H04W 88/02 |
| 2022/0201581 A1* | 6/2022 | Li ........................ H04W 36/304 |
| 2022/0345957 A1* | 10/2022 | Rugeland .............. H04W 76/16 |

FOREIGN PATENT DOCUMENTS

| | | |
|---|---|---|
| CN | 111148150 A | 5/2020 |
| WO | 2015113254 A1 | 8/2015 |
| WO | 2018203710 A1 | 11/2018 |
| WO | 2019029565 A1 | 2/2019 |
| WO | 2019101162 A1 | 5/2019 |

OTHER PUBLICATIONS

Interdigital Inc., "Discussion on Handling Split SRB during SCG Failure", 3GPP TSG-RAN WG2 Meeting #101, R2-1802818, Feb. 26-Mar. 2, 2018, 4 Pages, Athens, Greece.

Samsung, "(TP for SON BL CR for TS 38.423) XnAP impacts for the solution of SN change failure", 3GPP TSG-RAN WG3 #106, R3-197137, Nov. 18-22, 2019, 14 Pages, Reno, USA.

* cited by examiner

DATA SERVICE HANDOVER METHOD AND APPARATUS

CROSS-REFERENCE TO RELATED APPLICATIONS

This application is a National Stage of International Application No. PCT/CN2021/093891 filed on May 14, 2021, which claims priority to Chinese Patent Application No. 202010407134.0, filed with the China National Intellectual Property Administration on May 14, 2020 and entitled "Data Service Handover Method and Apparatus", which is incorporated herein by reference in its entirety.

TECHNICAL FIELD

This application relates to the field of communications technologies, and in particular, to a data service handover method and an apparatus.

BACKGROUND

To improve spectral efficiency and user throughput of a system, at present, a dual connectivity (dual connectivity, DC) technology is introduced. DC supports two base stations in providing data transmission service for one user equipment (user equipment, UE) at the same time. One base station is a master base station which may be called a master gNB (MgNB) or a master node (MN). The other base station is a secondary base station which may be called a secondary gNB (SgNB) or a secondary node (SN). In DC, a plurality of serving cells in the master base station form a master cell group (master cell group, MCG), including one primary cell/primary serving cell (primary cell/primary serving cell, PCell) and optionally one or more secondary cells/secondary serving cells (secondary cell/secondary serving cell, SCell). A plurality of serving cells in the secondary base station form a secondary cell group (secondary cell group, SCG), including one primary secondary cell (primary secondary cell, PSCell) and optionally one or more SCells.

In one DC architecture, a long term evolution (long term evolution, LTE) base station (for example, eNB) serves as an MN and a new radio (new radio, NR) base station (for example, gNB) serves as an SN for DC. In such DC architecture, air interface on the NR side is often subject to anomalies due to reasons such as network coverage, interference, and configuration, which may result in a possible SCG failure (SCG Failure). At present, there is still no comprehensive solution for handling an SCG failure that occurs on UE.

SUMMARY

Embodiments of this application provide a data service handover method and an apparatus, so as to implement data service handover in a scenario with an SCG failure.

According to a first aspect, this application provides a data service handover method, and the method may be applied to a terminal device, a chip, a chip set, a functional module executing the method in a chip, or the like. Using a terminal device as an example, the method includes: The terminal device determines occurrence of failure of an SCG and starts a timer; and if a network device has not handed over to a master base station within a timing duration of the timer a data service transmitted by the SCG, the terminal device notifies, when the timer expires, the network device to hand over the data service to the master base station.

In the embodiments of this application, when an SCG fail procedure is triggered on a UE side, a timer is started. If a network device side has not configured a DRB between the UE and the MN within a timing duration of the timer, the UE proactively triggers an operation of the network device handing over a data service to an MCG, thereby shortening an interruption time of the data service and reducing service jam.

In a possible design, when notifying the network device to hand over the data service to the master base station, the terminal device may send an RRC reestablishment request message to the network device, where the RRC reestablishment request message is used to notify the network device to reestablish an RRC connection between the master base station and the terminal device, and the RRC connection is used for the network device to transmit the data service handed over to the master base station to the terminal device. In the foregoing manner, an RRC reestablishment procedure is triggered through the RRC reestablishment request message. During the RRC reestablishment procedure, the network device can configure the DRB between the master base station and the terminal device for transmission of the data service, so that the data service can continue to be transmitted through the DRB, thereby handing over the data service to the master base station.

In a possible design, after sending the RRC reestablishment request message to the network device, the terminal device may further receive an RRC reestablishment message sent by the network device, where the RRC reestablishment message carries configuration information of the data radio bearer DRB between the terminal device and the master base station. The terminal device configures the DRB according to the configuration information carried in the RRC reestablishment message, where the DRB is used to transmit the data service between the master base station and the terminal device. In the foregoing manner, by establishing the DRB between the master base station and the terminal device, the terminal device can transmit the data service through the DRB between the master base station and the terminal device, thereby handing over the data service from a secondary base station to the master base station.

In a possible design, when notifying the network device to hand over the data service to the master base station, the terminal device may send a tracking area update (TAU) request message to the network device, where the TAU request message is used to notify the network device to hand over the data service to the master base station. In the foregoing manner, a TAU update procedure is triggered by the TAU request message. Due to the SCG failure, the network device can indicate the terminal device to release the SCG during the TAU update procedure, and configure the DRB between the master base station and the terminal device for transmission of the data service, so that the data service can continue to be transmitted through the DRB, thereby handing over the data service to the master base station.

In a possible design, after sending the tracking area update TAU request message to the network device, the terminal device may further receive a first RRC reconfiguration message sent by the network device, where the first RRC reconfiguration message carries configuration information of the DRB between the terminal device and the master base station, and the first RRC reconfiguration message indicates the terminal device to release the SCG. The terminal device releases the SCG according to the first RRC reconfiguration message, and configures the DRB between the terminal device and the master base station according to the configuration information carried in the first RRC reestablishment message, where the DRB is used to transmit the data service between the master base station and the terminal device. In the foregoing manner, by establishing the DRB between the master base station and the terminal device, the terminal device can transmit the data service through the DRB between the master base station and the terminal device, thereby handing over the data service from a secondary base station to the master base station.

In a possible design, before starting the timer, the terminal device may also send an SCG failure message to the network device, where the SCG failure message is used to notify the network device that an SCG failure has occurred; the terminal device receives an acknowledgment message sent by the network device, where the acknowledgment message is used to indicate that the network device has received the SCG failure message. In the foregoing design, the timer is started after it is determined that the network device has learned that an SCG failure has occurred, so that the time of data service handover can be better monitored.

In a possible design, after the terminal device starts the timer, if the terminal device receives within the timing duration of the timer a second RRC reconfiguration message sent by the network device, and the second RRC reconfiguration message carries configuration information of the DRB between the terminal device and the master base station, the terminal device may further configure the DRB between the terminal device and the master base station according to configuration information carried in the second RRC reconfiguration message, where the DRB is used to transmit the data service between the master base station and the terminal device. With the foregoing design, the terminal device can configure the DRB between the terminal device and the master base station within a timing duration of the timer according to the configuration information sent by the network device.

According to a second aspect, the embodiments of this application provide a communications apparatus, where the apparatus may be a terminal device or a chip in a terminal device. The apparatus may include a processing unit, a transceiver unit, and a receiving unit. It should be understood that the transmitting unit and the receiving unit herein may alternatively be a transceiver unit. In a case that the apparatus is a terminal device, the processing unit may be a processor, the transmitting unit and the receiving unit may be a transceiver; a communications device may further include a storage unit, where the storage unit may be a memory. The storage unit is configured to store instructions, and the processing unit executes the instructions stored in the storage unit, so as to cause the terminal device to perform the method according to the first aspect or any possible design of the first aspect. In a case that the apparatus is a chip in a terminal device, the processing unit may be a processor, and the transmitting unit and the receiving unit may be an input/output interface, a pin, a circuit, or the like. The processing unit executes instructions stored in the storage unit, so as to cause the chip to perform the method in the first aspect or any possible design of the first aspect. The storage unit is configured to store instructions, where the storage unit may be a storage unit (for example, a register, a cache, or the like) in the chip, or a storage unit (for example, a read-only memory, a random-access memory, or the like) in the terminal device located outside the chip.

According to a third aspect, the embodiments of this application further provide a computer-readable storage medium, where the computer-readable storage medium stores a computer program, and when the computer program is run on a computer, the computer is enabled to perform any possible method according to the first aspect.

According to a fourth aspect, the embodiments of this application further provide a computer program product including a program, which enables a computer to perform any possible method according to the first aspect when being run on the computer.

According to a fifth aspect, the embodiments of this application further provide a chip, where the chip is coupled to a memory, allowing the chip to call program instructions stored in the memory during operation to perform any possible method according to the first aspect.

DETAILED DESCRIPTION OF ILLUSTRATIVE EMBODIMENTS

To improve spectral efficiency and user throughput of a system, at present, a carrier aggregation (carrier aggregation, CA) technology and a DC technology are introduced.

In CA, UE can use a plurality of cells (carriers) at the same time for uplink or downlink communication, thereby supporting high-speed data transmission. In the plurality of cells, one cell may serve as a PCell for terminal devices, and the other cells may serve as SCells for the terminal devices.

DC supports two base stations in providing data transmission service for one UE at the same time. One base station is a master base station which may be called a master gNB (Master gNB, MgNB) or a master node (Master Node, MN). The other base station is a secondary base station which may be called a secondary gNB (secondary gNB, SgNB) or a secondary node (Secondary Node, SN). The master base station is a control plane anchor. That is, the UE establishes a radio resource control (radio resource control, RRC) connection with the master base station, and the master base station establishes a control plane connection with a core network, where RRC messages are transmitted between the master case station and the UE. In subsequent enhanced technologies, some RRC messages (for example, measurement configuration information, measurement reports, and the like) can also be transmitted between the secondary base station and the UE. It can be understood that the base station herein is merely an example, which may be a stand-alone base station, a DU, or other devices with a protocol stack. In DC, a plurality of serving cells in the master base station form a master cell group (master cell group, MCG), including one PCell and optionally one or more SCells. A plurality of serving cells in the secondary base station form an SCG, including one PSCell and optionally one or more SCells.

The DC architecture may include, but is not limited to, the following four types.

Figure 1:
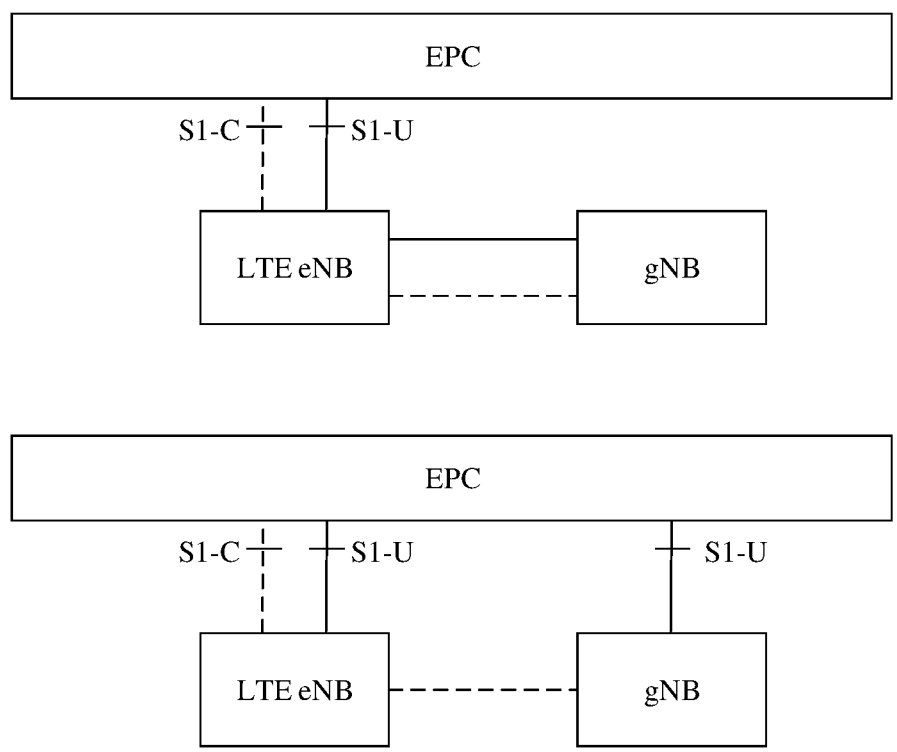
FIG. 1 is a schematic diagram of a DC architecture according to an embodiment of this application.

A first type is EN-DC (E-UTRA-NR Dual Connectivity). As shown in FIG. 1, an LTE base station (for example, eNB) serves as an MN, also called an anchor (anchor), and an NR base station (for example, gNB) serves as an SN for DC. Both the MN and the SN are connected to a 4G core network (evolved packet core, EPC) to provide air interface transmission resources for data between UE and the EPC.

Figure 2:
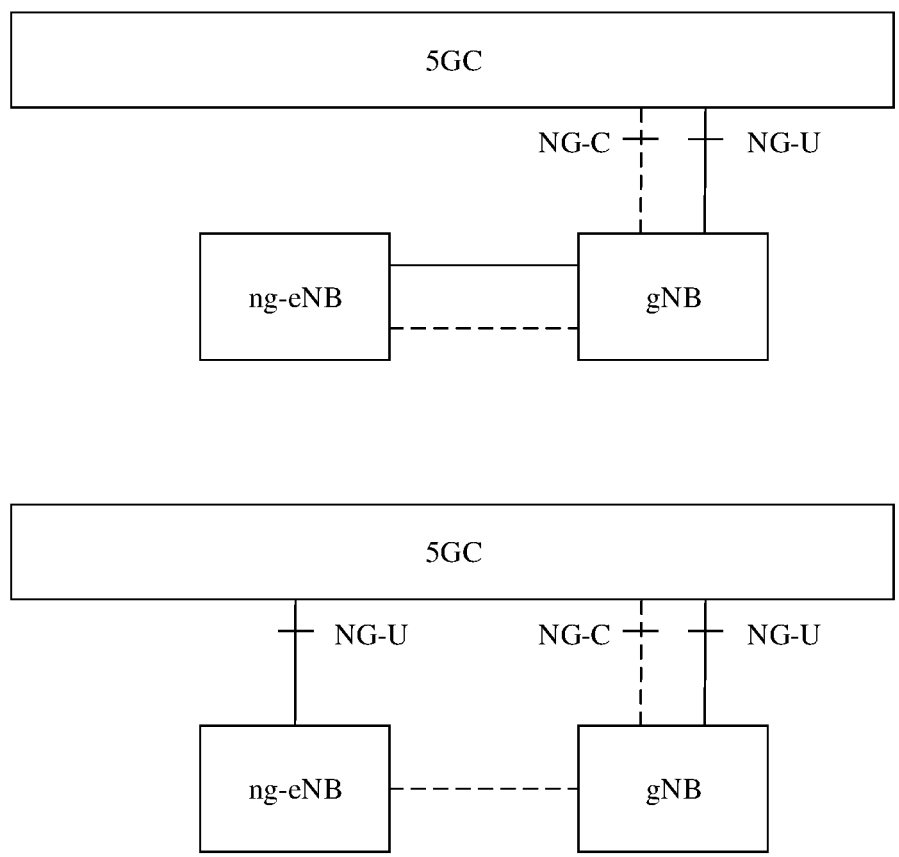
FIG. 2 is a schematic diagram of a DC architecture according to an embodiment of this application.

A second type is NE-DC (NR-E-UTRA Dual Connectivity). As shown in FIG. 2, an NR base station (for example, gNB) serves as an MN, and an LTE base station (for example, ng-eNB) serves as an SN. Both the MN and the SN are connected to a 5G core network (5G core, 5GC) to provide air interface transmission resources for data between UE and the 5GC.

Figure 3:
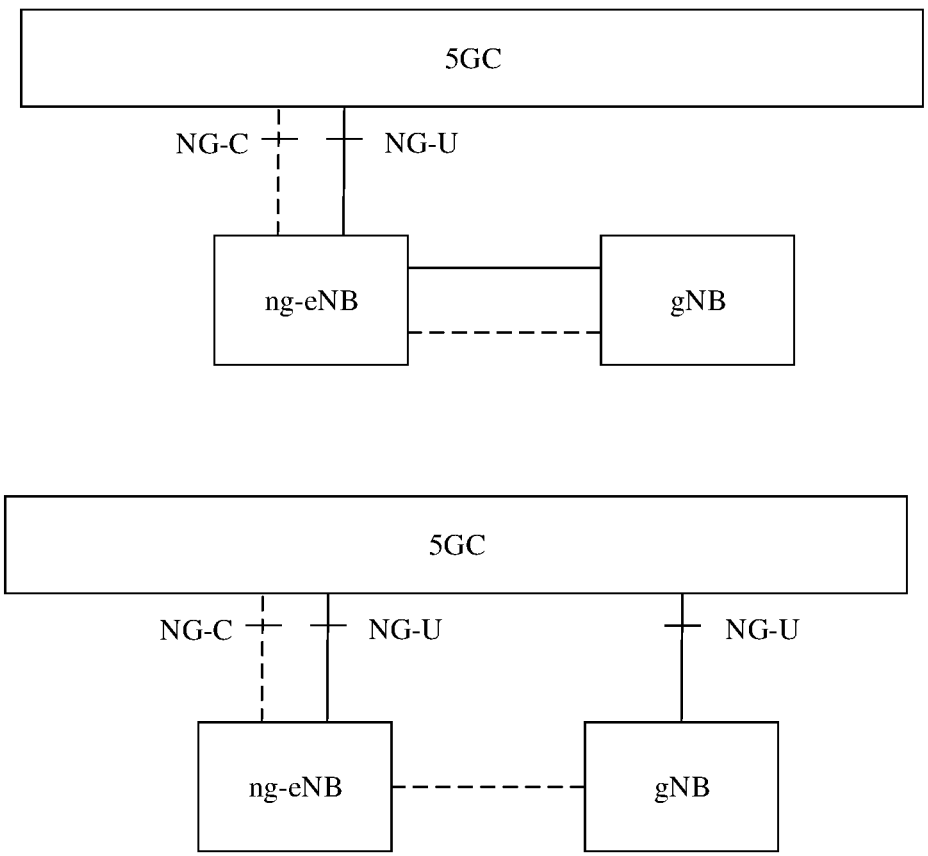
FIG. 3 is a schematic diagram of a DC architecture according to an embodiment of this application.

A third type is NGEN-DC (NG-RAN E-UTRA-NR Dual Connectivity). As shown in FIG. 3, an LTE base station (for example, ng-eNB) serves as an MN, and an NR base station (for example, gNB) serves as an SN for DC. Both the MN and the SN are connected to 5GC to provide air interface transmission resources for data between UE and the 5GC.

A fourth type is, in addition to the above three kinds of LTE and NR DC, that 5G also supports NR and NR DC (NR-DC), that is, both the MN and the SN are NR base stations, and both the master base station and the secondary base station are connected to 5GC.

Figure 4:
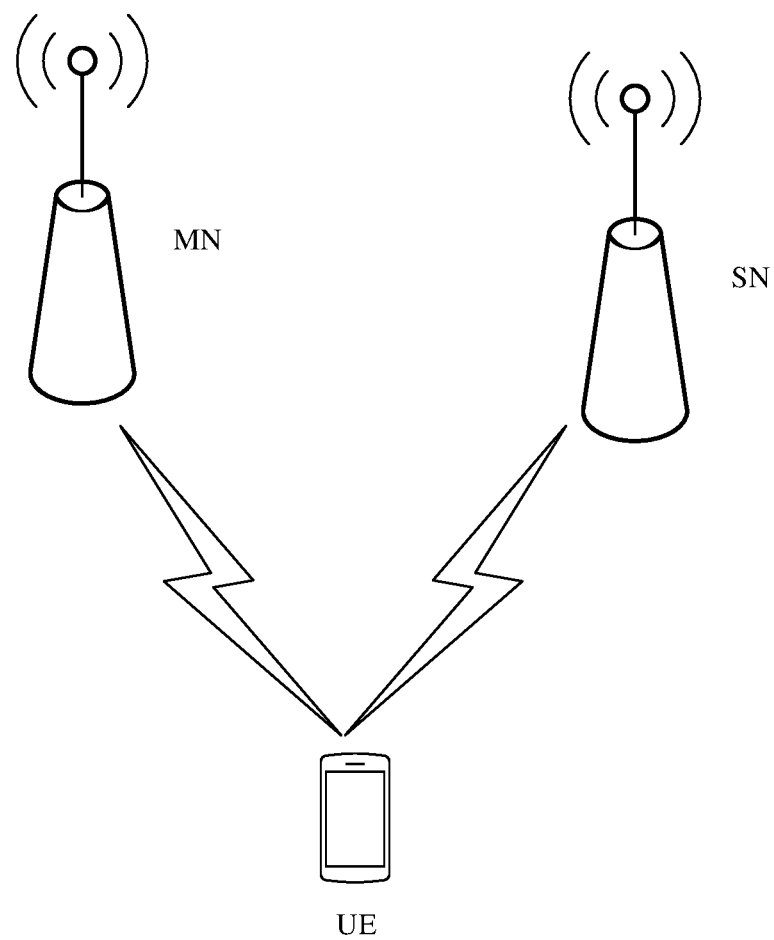
FIG. 4 is a schematic diagram of an architecture of a communications system according to an embodiment of this application.

The data service handover method provided in this embodiment of this application may be applied to the communications system shown in FIG. 4. This communications system may include one terminal device and two network devices, and the terminal device is in a DC relationship with the two network devices. For the connecting architecture of the two network devices, reference may be made to the DC architecture shown in FIG. 3. It should be understood that FIG. 4 is merely an exemplary illustration, and does not specifically limit the numbers of terminal devices and network devices included in the communications system.

The data service handover method provided in this application may also be applied to various communications systems, for example, an internet of things (internet of things, IoT) system, a narrow band internet of things (narrow band internet of things, NB-IoT) system, an LTE system, a 5th-generation (5G) communications system, a hybrid architecture of LTE and 5G, a 5G NR system, and new communications systems emerging in future communication development.

The terminal device involved in the embodiments of this application is an entity on the user side that is used to receive or transmit signals. The terminal device may be a device that provides voice and/or data connectivity to a user, for example, a handheld device or in-vehicle device with a wireless connection function. The terminal device may also be other processing devices that are connected to a wireless modem. The terminal device can communicate with a radio access network (radio access network, RAN). The terminal device may also be referred to as a wireless terminal, a subscriber unit (subscriber unit), a subscriber station (subscriber station), a mobile station (mobile station), a mobile (mobile), a remote station (remote station), an access point (access point), a remote terminal (remote terminal), an access terminal (access terminal), a user terminal (user terminal), a user agent (user agent), a user device (user device), user equipment (user equipment, UE), or the like. The terminal device may be a mobile terminal such as a mobile phone (or referred to as a "cellular" phone) and a computer provided with a mobile terminal. For example, the terminal device may be a portable, pocket-sized, handheld, computer built-in, or in-vehicle mobile apparatus, which exchanges voices and/or data with the wireless access network. For example, the terminal device may also be a device such as a personal communication service (personal communication service, PCS) phone, a cordless telephone, a session initiation protocol (session initiation protocol, SIP) phone, a wireless local loop (wireless local loop, WLL) station, or a personal digital assistant (personal digital assistant, PDA). Common terminal devices include, for example, mobile phones, tablet computers, notebook computers, palmtop computers, mobile internet devices (mobile internet device, MID), and wearable devices, such as a smart watch, a smart band, and a pedometer. This is not limited in the embodiments of this application.

The network device involved in the embodiments of this application is an entity on the network side that is used to transmit or receive signals. For example, the network device may be an evolved Node B (evolutional Node B, eNB or e-NodeB) in LTE, a new radio controller (new radio controller, NR controller), a gNode B (gNB) in a 5G system, a centralized unit (centralized unit), a new radio base station, a remote radio unit, a micro base station, a relay (relay), a distributed unit (distributed unit), a transmission reception point (transmission reception point, TRP), a transmission point (transmission point, TP), or any other radio access devices. This is not limited in the embodiments of this application. The network device may cover one or more cells.

The network architecture and the service scenarios described in the embodiments of this application are to more clearly describe the technical solutions of the embodiments of this application and do not constitute any limitation on the technical solutions provided in the embodiments of this application. A person of ordinary skill in the art knows that with the evolution of the network architecture and the emergence of new service scenarios, the technical solutions provided in the embodiments of this application are also applicable to resolve similar technical problems.

In the DC architecture shown in FIG. 3, by adding the SCG, high-speed data services can be performed through the NR base station. However, the air interface on the NR side is often subject to anomalies due to reasons such as network coverage, interference, and configuration, characterized by SCG fail (or referred to SCG failure). The SCG fail procedure is to notify the E-UTRAN UE that an SCG fail has occurred, for example, an SCG radio link failure, an SCG reconfiguration synchronization failure, an SCG SRB3 configuration failure, an SCG integrity protection failure, and reach of radio link control (radio link control, RLC) maximum retransmissions. After the SCG fail, for a data service originally configured on the NR, the network needs to reconfigure a data radio bearer (data radio bearer, DRB) and release the SCG to hand over the service to the MN. If the network keeps the SCG unreleased for a long time, the data service will not be able to run for a long time.

Based on this, the embodiments of this application provide a data service handover method and an apparatus, so as to resolve the problem of data service interruption caused by SCG fail. The method and the apparatus are based on a same technical concept. Since principles of the method and the apparatus to resolve problems are alike, implementations of the apparatus and the method can be referenced mutually and repetition is avoided herein.

It should be understood that, in the embodiments of this application, "at least one" means one or more, and "a plurality of" means two or more. The term "and/or" describes an association relationship between associated objects, and indicates that three relationships may exist. For example, A and/or B may represent the following cases: only A, both A and B, and only B, where A and B may be singular or plural. The character "/" generally indicates an "or" relationship between the associated objects before and after the character. "At least one of the following items (objects)" or a similar expression means any combination of these items, including a single item (object) or any combination of a plurality of items (objects). For example, at least one item (object) of a, b or c can represent: a; b; c; a and b; a and c; b and c; or a, b and c, where a, b, and c may be singular or plural.

It should be understood that the terms used in this application are for the purpose of describing specific embodiments only, and not for limiting the application. The singular forms preceded by "a/an", "the" and "such" used in this application and the appended claims are also intended to include their plural forms, unless otherwise specified expressly in the context.

In addition, although the terms first, second, third, and the like may be used in this application to describe various information, such information should not be limited to these terms. These terms are merely used to distinguish the same type of information from each other. For example, without departing from the scope of this application, first information may also be referred to as second information, and similarly, second information may also be referred to as first information. Depending on the context, the word "if" as used herein can be interpreted as "at the time of" or "when" or "in response to determining".

The following describes the data service handover method provided in this application in detail with reference to the accompanying drawings.

Figure 5:
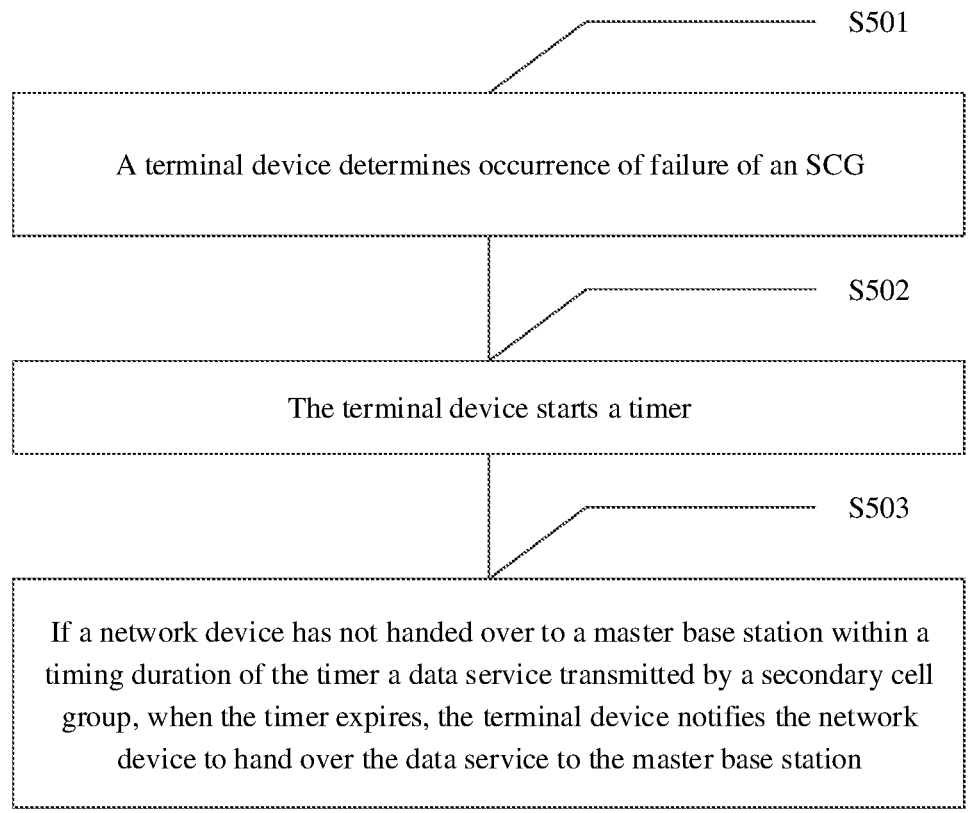
FIG. 5 is a schematic flowchart of a data service handover method according to an embodiment of this application.

FIG. 5 shows a data service handover method provided in the embodiments of this application. The method can be applied between a terminal device and a network device. The method may specifically include the following.

S501: The terminal device determines occurrence of failure of an SCG.

For example, the terminal device may determine the occurrence of failure of the SCG when failing to configure SCG radio links. Alternatively, the terminal device may determine the occurrence of failure of the SCG when failing to configure SCG synchronization. Alternatively, the terminal device may determine the occurrence of failure of the SCG when failing to configure SCG SRB3. Alternatively, the terminal device may determine the occurrence of failure of the SCG when the SCG reaches the maximum number of RLC retransmissions. Certainly, the terminal device may alternatively detect failure of the SCG in other ways. Examples are not described one by one herein.

S502: The terminal device starts a timer.

In some embodiments, after detecting the failure of the SCG, the terminal device may send an SCG failure message to the network device, where the SCG failure message is used to notify the network device that an SCG failure has occurred; and the terminal device may start the timer when receiving an acknowledgment message sent by the network device, where the acknowledgment message is used to indicate that the network device has received the SCG failure message.

In some other embodiments, the terminal device may start the timer when detecting the failure of the SCG.

S503: If the network device has not handed over to a master base station within a timing duration of the timer a data service transmitted by a secondary cell group, the terminal device notifies, when the timer expires, the network device to hand over the data service to the master base station.

Optionally, after the terminal device starts the timer, if the terminal device receives within the timing duration of the timer a second RRC reconfiguration message sent by the network device, and the second RRC reconfiguration message carries configuration information of a DBR between the terminal device and the master base station, the terminal device configures the DRB between the terminal device and the master base station according to the configuration information carried in the second RRC reconfiguration message, where the DRB is used to transmit the data service between the master base station and the terminal device.

In the embodiments of this application, when SCG fail is triggered on the UE side, a timer is started. If the network device side has not configured a DRB between the UE and the MN within a timing duration of the timer, the UE proactively triggers the network device handing over a data service to an MCG, thereby shortening an interruption time of the data service and reducing service jam.

In an implementation, that the terminal device notifies the network device to hand over the data service to the master base station may be implemented in the following manner: the terminal device sends an RRC reestablishment request message to the network device, where the RRC reestablishment request message is used to notify the network device to reestablish an RRC connection between the master base station and the terminal device, and the RRC connection is used for the network device to transmit the data service handed over to the master base station to the terminal device. In the foregoing manner, the LTE-RRC reestablishment procedure is triggered by using the RRC reestablishment request message, that is, the network device is triggered to configure the DRB between the master base station and the terminal device for transmitting the data service.

Further, after receiving the RRC reestablishment request message, the network device may further send an RRC reestablishment message to the terminal device, where the RRC reestablishment message carries configuration information of the DRB between the terminal device and the master base station. The terminal device configures the DRB according to the configuration information carried in the RRC reestablishment message, where the DRB is used to transmit the data service between the master base station and the terminal device. In the foregoing manner, by establishing the DRB between the master base station and the terminal device, the terminal device can transmit the data service through the DRB between the master base station and the terminal device, thereby handing over the data service from a secondary base station to the master base station.

In another implementation, that the terminal device notifies the network device to hand over the data service to the master base station may alternatively be implemented in the following manner: the terminal device sends a tracking area update (tracking area update, TAU) request message to the network device, where the TAU request message is used to notify the network device to hand over the data service to the master base station. In the foregoing manner, the TAU request message is used to trigger the network device to configure the DRB between the master base station and the terminal device for transmitting the data service.

Further, after receiving the TAU request message, the network device may further send a first RRC reconfiguration message to the terminal device, where the first RRC reconfiguration message carries configuration information of the DRB between the terminal device and the master base station, and the first RRC reconfiguration message indicates the terminal device to release an SCG. The terminal device releases the SCG according to the first RRC reconfiguration message, and configures the DRB between the terminal device and the master base station according to the configuration information carried in the first RRC reestablishment message, where the DRB is used to transmit the data service between the master base station and the terminal device. In the foregoing manner, by establishing the DRB between the master base station and the terminal device, the terminal device can transmit the data service through the DRB between the master base station and the terminal device, thereby handing over the data service from the secondary base station to the master base station.

To provide better understanding of the embodiments of this application, the following describes the data service handover procedure in detail with reference to specific examples.

EXAMPLE 1

Figure 6:
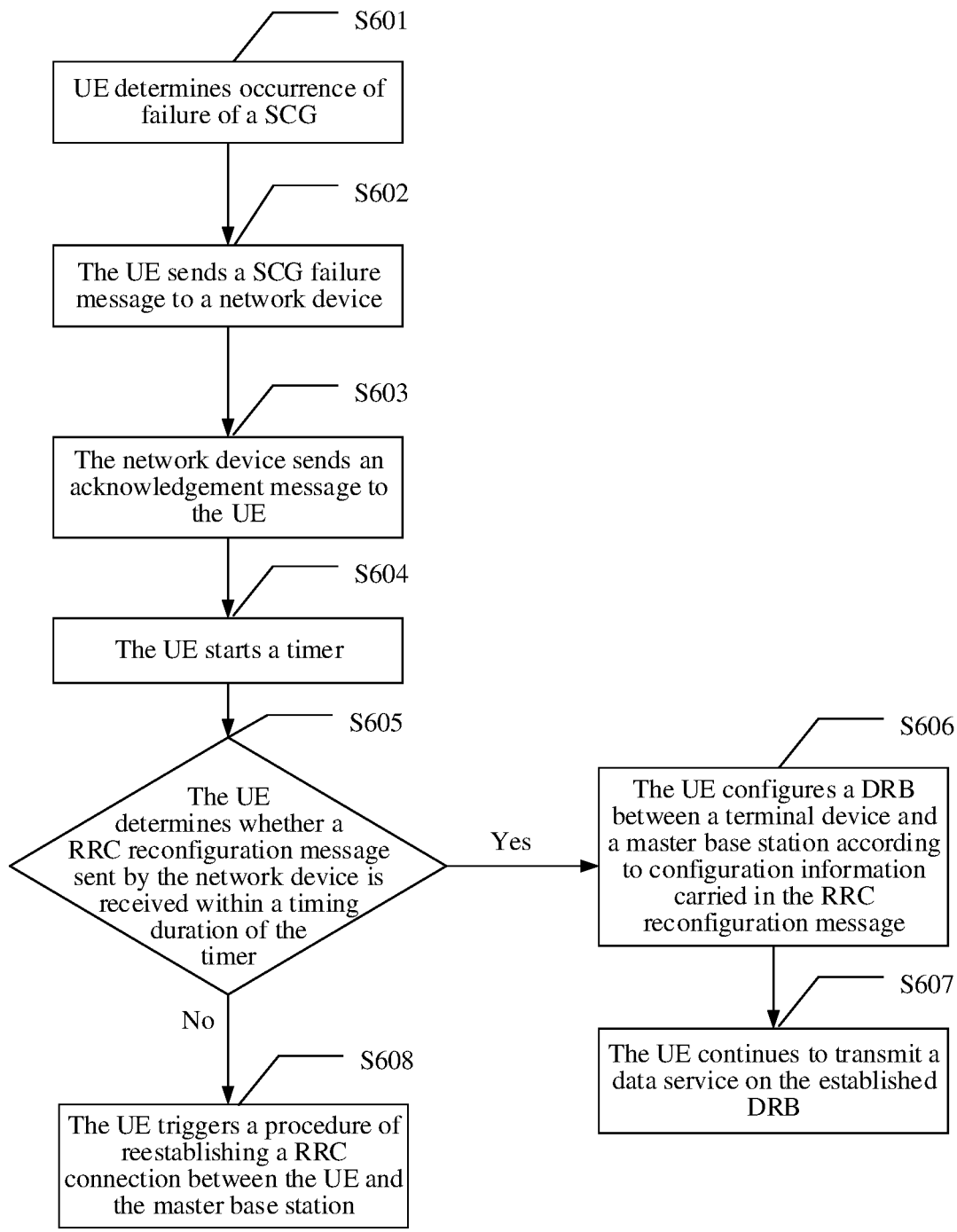
FIG. 6 is a schematic diagram of a data service handover procedure according to an embodiment of this application.

As shown in FIG. 6, the data service handover procedure may include the following.

S601: UE determines that an SCG fail has occurred. Step S602 is performed.

S602: The UE sends an SCG failure message to a network device. Step S603 is performed.

S603: The network device sends an acknowledgment message to the UE to notify the UE that the network device has received the SCG failure message. Step S604 is performed.

S604: The UE starts a timer, and performs step S605.

S605: The UE determines whether an RRC reconfiguration message sent by the network device is received within a timing duration of the timer, where the RRC reconfiguration message is used to release the SCG, and the RRC reconfiguration message carries configuration information of a DRB between the UE and an MCG. If an RRC reconfiguration message sent by the network device is received within the timing duration of the timer, step S606 is performed; or if an RRC reconfiguration message sent by the network device is not received within the timing duration of the timer, step S608 is performed.

S606: The UE configures a DRB between the UE and a master base station according to configuration information carried in the RRC reconfiguration message, where the DRB is used to continue to transmit the data service. Step S607 is performed.

S607: The UE continues to transmit the data service on the established DRB.

S608: The UE triggers a procedure of reestablishing an RRC connection between the UE and the master base station.

In the procedure of reestablishing the RRC connection between the UE and the master base station, the network device may configure for the UE the DRB between the UE and the master base station, so that the UE can establish and configure the DRB between the UE and the master base station, and then the data service can continue to be transmitted through the DRB.

In an implementation, the UE may send an RRC reestablishment request message to the network device, where the RRC reestablishment request message is used to notify the network device to reestablish the RRC connection between the master base station and the terminal device. The network device sends an RRC reestablishment message to the UE, where the RRC reestablishment message carries the configuration information of the DRB between the UE and the master base station. The UE configures the DRB between the UE and the master base station according to the configuration information carried in the RRC reestablishment message.

For example, the RRC reestablishment request message may be a long term evolution RRC (LTE RRC, LRRC) reestablishment request message for establishing an LTE RRC connection. Because the master base station is an LTE base station, the UE may request the network device to establish an RRC connection between the master base station and the UE by sending an LRRC reestablishment request message to the network device.

EXAMPLE 2

Figure 7:
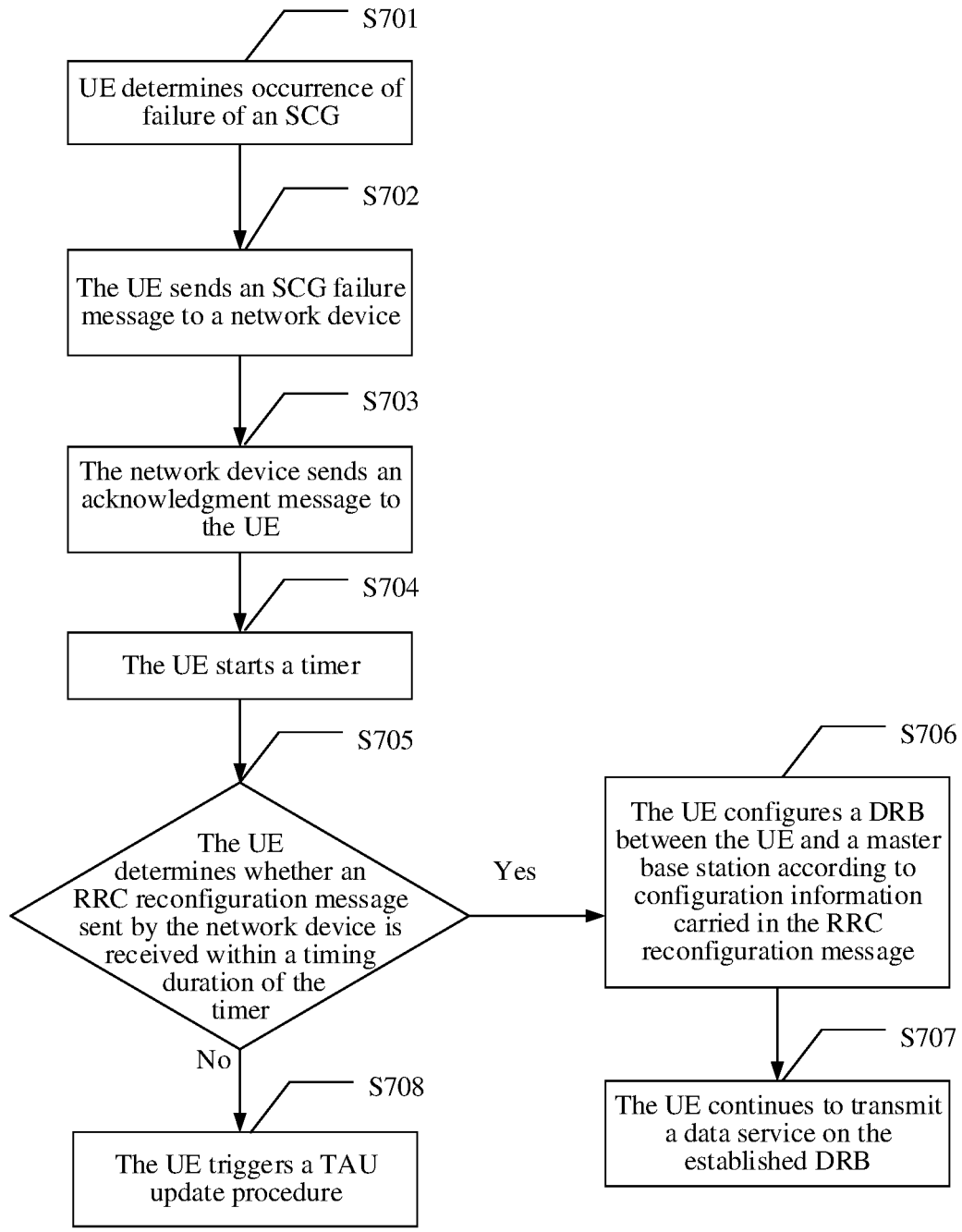
FIG. 7 is a schematic diagram of a data service handover procedure according to an embodiment of this application.

As shown in FIG. 7, the data service handover procedure may include following.

S701: UE determines that an SCG fail has occurred. Step S702 is performed.

S702: The UE sends an SCG failure message to a network device. Step S703 is performed.

S703: The network device sends an acknowledgment message to the UE to notify the UE that the network device has received the SCG failure message. Step S704 is performed.

S704: The UE starts a timer, and performs step S705.

S705: The UE determines whether an RRC reconfiguration message sent by the network device is received within a timing duration of the timer, where the RRC reconfiguration message is used to release the SCG, and the RRC reconfiguration message carries configuration information of a DRB between the UE and a master base station. If an RRC reconfiguration message sent by the network device is received within the timing duration of the timer, step S706 is performed; or if an RRC reconfiguration message sent by the network device is not received within the timing duration of the timer, step S708 is performed.

S706: The UE configures a DRB between the UE and the master base station according to the configuration information carried in the RRC reconfiguration message, where the DRB is used to continue to transmit the data service. Step S707 is performed.

S707: The UE continues to transmit the data service on the established DRB.

S708: The UE triggers a TAU update procedure.

In the TAU update procedure, the network device may indicate, according to the SCG failure message, the UE to release the SCG, and configure the DRB between the UE and the master base station, so that the UE can establish and configure the DRB between the UE and the master base station, and then the data service can continue to be transmitted through the DRB.

In an implementation, the UE may send a TAU request message to the network device, where the TAU request message is used to request the network device to update a tracking area (tracking area, TA) of the UE. When the network device is updating the TA of the UE, due to the occurrence of failure of the SCG, the network device may send an RRC reconfiguration message to the UE, where the RRC reconfiguration message is used to indicate the UE to release the SCG, and the RRC reconfiguration message carries the configuration information of the DRB between the UE and the master base station. The UE releases the SCG, and configures the DRB between the UE and the master base station according to the configuration information carried in the RRC reconfiguration message.

Figure 8:
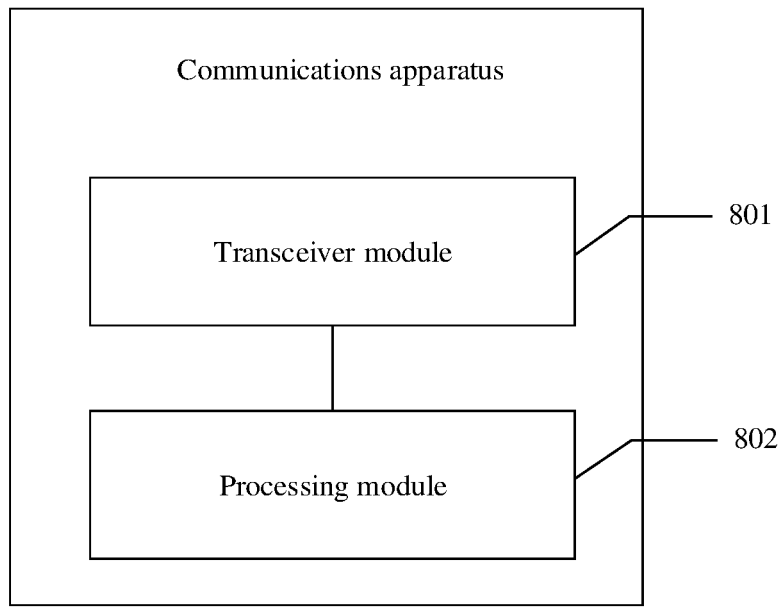
FIG. 8 is a schematic structural diagram of a communications apparatus according to an embodiment of this application.

Based on the same technical concept as the method embodiments, the embodiments of this application provide a communications apparatus. The communications apparatus may be specifically used to implement the method performed by the terminal device in the embodiments as shown in FIG. 5 to FIG. 7. The apparatus may be a terminal device itself, or may be a chip or chip set in a terminal device or a part of a chip for executing related functions of the method. The structure of the communications apparatus may be as shown in FIG. 8, including a transceiver module 801 and a processing module 802. The transceiver module 801 is configured to communicate with a network device. The processing module 802 is configured to: determine occurrence of failure of an SCG, and start a timer; and if the network device has not handed over to a master base station within a timing duration of the timer a data service transmitted by the SCG, notify, through the transceiver module 801 when the timer expires, the network device to hand over the data service to the master base station.

In an implementation, when notifying, through the transceiver module 801, the network device to hand over the data service to the master base station, the processing module 802 may be specifically configured to: send an RRC reestablishment request message to the network device through the transceiver module 801, where the RRC reestablishment request message is used to notify the network device to reestablish an RRC connection between the master base station and the terminal device, and the RRC connection is used for the network device to transmit the data service handed over to the master base station to the terminal device.

Optionally, the transceiver module 801 may further be configured to, after the processing module 802 sends the RRC reestablishment request message to the network device through the transceiver module 804 receive an RRC reestablishment message sent by the network device, where the RRC reestablishment message carries configuration information of a data radio bearer DRB between the terminal device and the master base station.

The processing module 802 may further be configured to: configure the DRB between the terminal device and the master base station according to the configuration information carried in the RRC reestablishment message, where the DRB is used to transmit the data service between the master base station and the terminal device.

In another implementation, when notifying, through the transceiver module 801, the network device to hand over the data service to the master base station, the processing module 802 may be specifically configured to: send a tracking area update TAU request message to the network device through the transceiver module 801, where the TAU request message is used to notify the network device to hand over the data service to the master base station.

In an implementation, the transceiver module 801 may further be configured to: after the processing module 802 sends the tracking area update TAU request message to the network device through the transceiver module 801, receive a first RRC reconfiguration message sent by the network device, where the first RRC reconfiguration message carries configuration information of the DRB between the terminal device and the master base station, and the first RRC reconfiguration message indicates the terminal device to release the SCG.

The processing module 802 may further be configured to: release the SCG according to the first RRC reconfiguration message, and configure the DRB between the terminal device and the master base station according to the configuration information carried in the first RRC reestablishment message, where the DRB is used to transmit the data service between the master base station and the terminal device.

In some embodiments, the transceiver module 801 may further be configured to: before the processing module 802 starts the timer, send an SCG failure message to the network device, where the SCG failure message is used to notify the network device that an SCG failure has occurred; and receive an acknowledgment message sent by the network device, where the acknowledgment message is used to indicate that the network device has received the SCG failure message.

Optionally, the processing module 802 may further be configured to: if a second RRC reconfiguration message sent by the network device is received through the transceiver module 801 within the timing duration of the timer, and the second RRC reconfiguration message carries configuration information of a DRB between the terminal device and the master base station, configure the DRB between the terminal device and the master base station according to the configuration information carried in the second RRC reconfiguration message, where the DRB is used to transmit the data service between the master base station and the terminal device.

Division of the modules in the embodiments of this application is merely an example for illustration, and is only logical function division, which may be other division in actual implementation. In addition, the functional modules in the embodiments of this application may be integrated into one processor or exist alone physically, or two or more modules may be integrated into one module. The integrated module may be implemented in a form of hardware, or may be implemented in a form of a software functional module. It can be understood that, for the functions or implementations of the modules in the embodiments of this application, further reference may be made to the related descriptions of the method embodiments.

Figure 9:
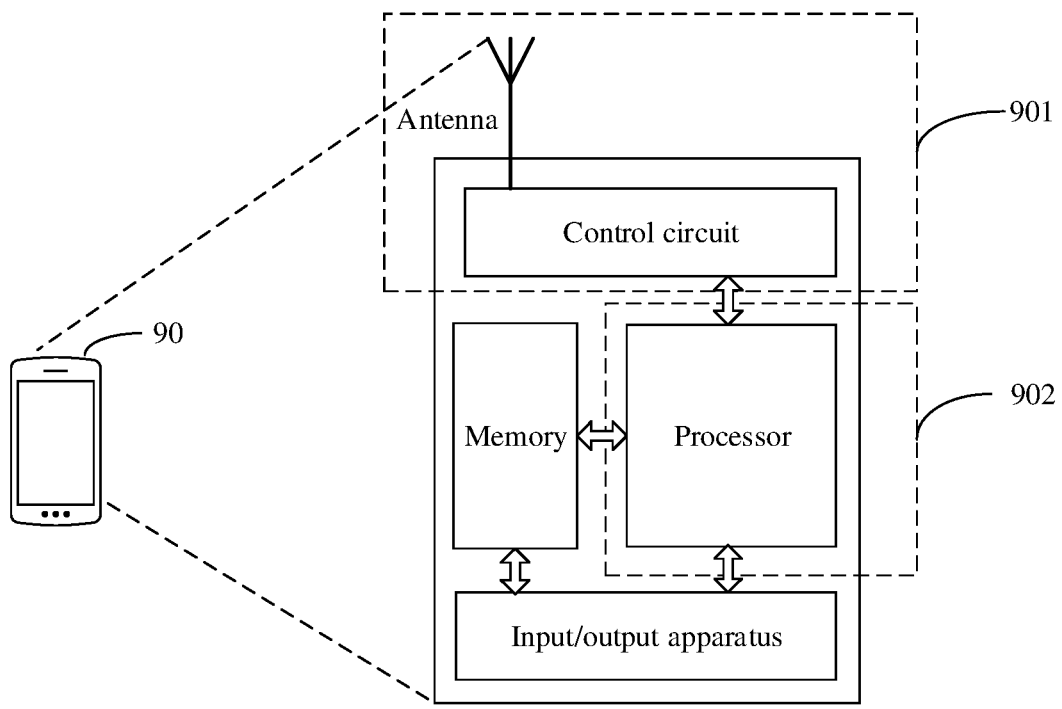
FIG. 9 is a schematic structural diagram of a terminal device according to an embodiment of this application.

FIG. 9 is a schematic structural diagram of a terminal device according to an embodiment of this application. The terminal device can perform functions of the terminal device in the method embodiments in FIG. 5 to FIG. 7. For ease of description, FIG. 9 only shows main components of the terminal device. As shown in FIG. 9, the terminal device 90 includes a processor, a memory, a control circuit, an antenna, and an input/output apparatus. The processor is configured to mainly process communication protocols and communication data, control the entire terminal device, execute software programs, and process data of software programs, and for example, is configured to support the terminal device performing the actions in the method embodiments described in FIG. 5 to FIG. 7. The memory is mainly configured to store software programs and data. The control circuit is configured mainly for the conversion between baseband signals and radio frequency signals and processing of radio frequency signals. The control circuit together with the antenna may also be referred to as a transceiver, which is configured to mainly send and receive a radio frequency signal in the form of electromagnetic waves. The input/ output apparatus, such as a touch screen, a display screen, a keyboard, and the like is configured to mainly receive data input by a user and output data to a user.

When the terminal device is powered on, the processor can read a software program in the memory, decode and execute instructions of the software program, and process data of the software program. When data needs to be transmitted wirelessly, after performing baseband processing on the data to be transmitted, the processor outputs a baseband signal to the radio frequency circuit, and the radio frequency circuit performs radio frequency processing on the baseband signal and transmits the radio frequency signal to the outside in the form of electromagnetic waves through the antenna. When data is transmitted to the terminal device, the radio frequency circuit receives a radio frequency signal through the antenna, converts the radio frequency signal into a baseband signal, and outputs the baseband signal to the processor, and the processor translates the baseband signal into data and processes the data.

A person skilled in the art can understand that, for ease of description, FIG. 9 only shows one memory and one processor. In an actual terminal device, a plurality of processors and a plurality of memories may be present. The memory may also be called a storage medium, a storage device, or the like. The memory may be a storage element on the same chip as the processor, that is, an on-chip storage element, or a stand-alone storage element, which is not limited in the embodiments of this application.

In an optional implementation, the terminal device may include a baseband processor and a central processor. The baseband processor is configured to mainly process communication protocols and communication data, and the central processor is configured to mainly control the entire terminal device, execute software programs, and process data of the software programs. The processor in FIG. 9 may integrate functions of the baseband processor and the central processor, or as can be understood by a person skilled in the art, the baseband processor and the central processor may be stand-alone processors that are interconnected by technologies such as a bus. A person skilled in the art can understand that the terminal device may include a plurality of baseband processors to adapt to different network standards. The terminal device may include a plurality of central processors to enhance its processing capacity, and the components of the terminal device may be connected through various buses. The baseband processor may also be described as a baseband processing circuit or a baseband processing chip. The central processor may also be described as a central processing circuit or a central processing chip. Functions of processing communication protocols and communication data may be built in the processor, or may be stored in the memory in the form of a software program, and the processor executes the software program to implement the baseband processing function.

In the embodiments of this application, that antenna having a transceiver function and the control circuit may be regarded as a transceiver unit 901 of the terminal device 90, which, for example, is configured to support the terminal device performing a receiving function and a transmitting function. The processor 902 having a processing function is regarded as a processing unit 902 of the terminal device 90. As shown in FIG. 9, the terminal device 90 includes a transceiver unit 901 and a processing unit 902. The transceiver unit may also be referred to as a transceiver, a transceiver apparatus, or the like. Optionally, a component used to implement a receiving function in the transceiver unit 901 may be regarded as a receiving unit, and a component used to implement a transmitting function in the transceiver unit 901 may be regarded as a transmitting unit. That is, the transceiver unit 901 includes a receiving unit and a transmitting unit. The receiving unit may also be referred to as a receiver, an input port, a receiving circuit, or the like, and the transmitting unit may be referred to as a transmitter, a transmitting circuit, or the like.

The processor 902 may be configured to execute instructions stored in the memory, so as to control the transceiver unit 901 to receive signals and/or transmit signals to complete the functions of the terminal device in the foregoing method embodiments. The processor 902 also includes an interface to implement signal input/output functions. As an implementation, it can be considered that the functions of the transceiver unit 901 are implemented by a transceiver circuit or a dedicated chip for transmitting and receiving.

Embodiments of this invention further provide a computer-readable storage medium configured to store computer software instructions to be executed by the foregoing processor, which includes a program to be executed by the processor.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that contain computer-usable program code.

This application is described with reference to the flowcharts and/or block diagrams of the method, device (system), and computer program product according to this application. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to produce a machine, such that the instructions, which are executed by the processor of the computer or another programmable data processing apparatus, create means for implementing a specific function in one or more processes in the flowcharts and/or in one or more blocks in the block diagrams.

These computer program instructions may be stored in a computer-readable memory that can direct the computer or any other programmable data processing device to function in a particular manner, such that the instructions stored in the computer-readable memory create an article of manufacture including an instruction apparatus which implements a specific function in one or more processes in the flowcharts and/or in one or more blocks in the block diagrams.

These computer program instructions may be loaded onto a computer or another programmable data processing device to cause a series of operational and steps to be performed on the computer or the another programmable device to produce computer-implemented processing, such that the instructions which are executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations provided that the modifications and variations in this application fall within the protection scope defined by the claims of this application and their equivalent technologies.

What is claimed is:

1. A data service handover method, wherein the method comprises:
   determining, by a terminal device, occurrence of failure of a secondary cell group (SCG);
   sending, by the terminal device, an SCG failure message to a network device, wherein the SCG failure message is used to notify the network device that an SCG failure has occurred;
   receiving, by the terminal device, an acknowledgment message sent by the network device, wherein the acknowledgment message is used to indicate that the network device has received the SCG failure message;
   starting, by the terminal device, a timer; and
   if the network device has not handed over to a master base station within a timing duration of the timer a data service transmitted by the SCG, notifying, by the terminal device when the timer expires, the network device to hand over the data service to the master base station.

2. The method according to claim 1, wherein the notifying, by the terminal device, the network device to hand over the data service to the master base station comprises:
   sending, by the terminal device, a radio resource control (RRC) reestablishment request message to the network device, wherein the RRC reestablishment request message is used to notify the network device to reestablish an RRC connection between the master base station and the terminal device, and the RRC connection is used for the network device to transmit the data service handed over to the master base station to the terminal device.

3. The method according to claim 2, wherein after the sending, by the terminal device, an RRC reestablishment request message to the network device, the method further comprises:
   receiving, by the terminal device, an RRC reestablishment message sent by the network device, wherein the RRC reestablishment message carries configuration information of a data radio bearer (DRB) between the terminal device and the master base station; and
   configuring, by the terminal device, the DRB according to the configuration information carried in the RRC reestablishment message, wherein the DRB is used to transmit the data service between the master base station and the terminal device.

4. The method according to claim 1, wherein the notifying, by the terminal device, the network device to hand over the data service to the master base station comprises:
   sending, by the terminal device, a tracking area update (TAU) request message to the network device, wherein the TAU request message is used to notify the network device to hand over the data service to the master base station.

5. The method according to claim 4, wherein after the sending, by the terminal device, a tracking area update (TAU) request message to the network device, the method further comprises:
   receiving, by the terminal device, a first RRC reconfiguration message sent by the network device, wherein the first RRC reconfiguration message carries configuration information of a data radio bearer (DRB) between the terminal device and the master base station, and the first RRC reconfiguration message indicates the terminal device to release the SCG; and
   releasing, by the terminal device, the SCG according to the first RRC reconfiguration message, and configuring the DRB between the terminal device and the master base station according to the configuration information carried in the first RRC reconfiguration message, wherein the DRB is used to transmit the data service between the master base station and the terminal device.

6. The method according to claim 1, wherein after the starting, by the terminal device, a timer, the method further comprises:
   if the terminal device receives within the timing duration of the timer a second RRC reconfiguration message sent by the network device, and the second RRC reconfiguration message carries configuration information of a data radio bearer (DRB) between the terminal device and the master base station, configuring, by the terminal device, the DRB between the terminal device and the master base station according to the configuration information carried in the second RRC reconfiguration message, wherein the DRB is used to transmit the data service between the master base station and the terminal device.

7. A data service handover apparatus, wherein the apparatus comprises:
   a transceiver module, configured to communicate with a network device; and
   a processing module, configured to determine occurrence of failure of a secondary cell group (SCG) and start a timer; and if the network device has not handed over to a master base station within a timing duration of the timer a data service transmitted by the SCG, notify, through the transceiver module when the timer expires, the network device to hand over the data service to the master base station;
   wherein the transceiver module is further configured to:
   before the processing module starts the timer, send an SCG failure message to the network device, wherein the SCG failure message is used to notify the network device that an SCG failure has occurred; and
   receive an acknowledgment message sent by the network device, wherein the acknowledgment message is used to indicate that the network device has received the SCG failure message.

8. The apparatus according to claim 7, wherein when notifying, through the transceiver module, the network device to hand over the data service to the master base station, the processing module is specifically configured to:
   send a radio resource control (RRC) reestablishment request message to the network device through the transceiver module, wherein the RRC reestablishment request message is used to notify the network device to reestablish an RRC connection between the master base station and a terminal device, and the RRC connection is used for the network device to transmit the data service handed over to the master base station to the terminal device.

9. The apparatus according to claim 8, wherein the transceiver module is further configured to:

after the processing module sends the RRC reestablishment request message to the network device through the transceiver module, receive an RRC reestablishment message sent by the network device, wherein the RRC reestablishment message carries configuration information of a data radio bearer (DRB) between the terminal device and the master base station; and the processing module is further configured to configure the DRB according to the configuration information carried in the RRC reestablishment message, wherein the DRB is used to transmit the data service between the master base station and the terminal device.

10. The apparatus according to claim 7, wherein when notifying, through the transceiver module, the network device to hand over the data service to the master base station, the processing module is specifically configured to:

send a tracking area update (TAU) request message to the network device through the transceiver module, wherein the TAU request message is used to notify the network device to hand over the data service to the master base station.

11. The apparatus according to claim 10, wherein the transceiver module is further configured to:

after the processing module sends the TAU request message to the network device through the transceiver module, receive a first RRC reconfiguration message sent by the network device, wherein the first RRC reconfiguration message carries configuration information of a DRB between a terminal device and the master base station, and the first RRC reconfiguration message indicates the terminal device to release the SCG; and the processing module is further configured to:

release the SCG according to the first RRC reconfiguration message, and configure the DRB between the terminal device and the master base station according to the configuration information carried in the first RRC reconfiguration message, wherein the DRB is used to transmit the data service between the master base station and the terminal device.

12. The apparatus according to claim 7, wherein the processing module is further configured to:

if a second RRC reconfiguration message sent by the network device is received through the transceiver module within the timing duration of the timer, and the second RRC reconfiguration message carries configuration information of a data radio bearer (DRB) between a terminal device and the master base station, configure the DRB between the terminal device and the master base station according to the configuration information carried in the second RRC reconfiguration message, wherein the DRB is used to transmit the data service between the master base station and the terminal device.

13. A communications device, comprising:

a transceiver, a processor, and a memory, wherein the memory stores program instructions, and when the program instructions are executed by the processor, the communications device is caused to perform;

determining occurrence of failure of a secondary cell group (SCG);

sending an SCG failure message to a network device, wherein the SCG failure message is used to notify the network device that an SCG failure has occurred;

receiving an acknowledgment message sent by the network device, wherein the acknowledgment message is used to indicate that the network device has received the SCG failure message;

starting a timer; and if the network device has not handed over to a master base station within a timing duration of the timer a data service transmitted by the SCG, notifying, when the timer expires, the network device to hand over the data service to the master base station.

14. The communications device according to claim 13, wherein notifying the network device to hand over the data service to the master base station comprises:

sending a radio resource control (RRC) reestablishment request message to the network device, wherein the RRC reestablishment request message is used to notify the network device to reestablish an RRC connection between the master base station and the communications device, and the RRC connection is used for the network device to transmit the data service handed over to the master base station to the communications device.

15. The communications device according to claim 14, wherein when the program instructions are executed by the processor, the communications device is caused to further perform:

after sending the RRC reestablishment request message to the network device, receiving an RRC reestablishment message sent by the network device, wherein the RRC reestablishment message carries configuration information of a data radio bearer (DRB) between the communications device and the master base station; and configuring the DRB according to the configuration information carried in the RRC reestablishment message, wherein the DRB is used to transmit the data service between the master base station and the communications device.

16. The communications device according to claim 13, wherein notifying the network device to hand over the data service to the master base station comprises:

sending a tracking area update (TAU) request message to the network device, wherein the TAU request message is used to notify the network device to hand over the data service to the master base station.

17. The communications device according to claim 16, wherein when the program instructions are executed by the processor, the communications device is caused to further perform:

after the sending the TAU request message to the network device, receiving a first RRC reconfiguration message sent by the network device, wherein the first RRC reconfiguration message carries configuration information of a data radio bearer (DRB) between the communications device and the master base station, and the first RRC reconfiguration message indicates the communications device to release the SCG; and releasing the SCG according to the first RRC reconfiguration message, and configuring the DRB between the communications device and the master base station according to the configuration information carried in the first RRC reconfiguration message, wherein the DRB is used to transmit the data service between the master base station and the communications device.

18. The communications device according to claim 13, wherein when the program instructions are executed by the processor, the communications device is caused to further perform:

after starting the timer, if the communications device receives within the timing duration of the timer a second RRC reconfiguration message sent by the network device, and the second RRC reconfiguration message carries configuration information of a data radio bearer (DRB) between the communications device and the master base station, configuring the DRB between the communications device and the master base station according to the configuration information carried in the second RRC reconfiguration message, wherein the DRB is used to transmit the data service between the master base station and the communications device.

* * * * *